United States Patent
Yabe et al.

(10) Patent No.: US 10,838,379 B2
(45) Date of Patent: Nov. 17, 2020

(54) HOME ENERGY MANAGEMENT AND CONTROL SYSTEM, CONTROLLER, AND METHOD BASED ON USER OCCUPANCY AND NON-TRANSITORY COMPUTER-READABLE RECORDING MEDIUM

(71) Applicant: Mitsubishi Electric Corporation, Tokyo (JP)

(72) Inventors: Masaaki Yabe, Tokyo (JP); Ichiro Maruyama, Tokyo (JP); Satoshi Minezawa, Tokyo (JP); Toshiaki Yoshikawa, Tokyo (JP); Hirotoshi Yano, Tokyo (JP); Daisuke Iizawa, Tokyo (JP); Kenichiro Tanaka, Tokyo (JP); Takashi Ogino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 72 days.

(21) Appl. No.: 14/888,727

(22) PCT Filed: Mar. 28, 2014

(86) PCT No.: PCT/JP2014/059211
§ 371 (c)(1),
(2) Date: Nov. 3, 2015

(87) PCT Pub. No.: WO2014/185174
PCT Pub. Date: Nov. 20, 2014

(65) Prior Publication Data
US 2016/0085222 A1    Mar. 24, 2016

(30) Foreign Application Priority Data
May 17, 2013   (JP) .................... 2013-105161

(51) Int. Cl.
*G05B 15/02* (2006.01)
*G08C 17/02* (2006.01)
*H04L 12/28* (2006.01)

(52) U.S. Cl.
CPC ............. *G05B 15/02* (2013.01); *G08C 17/02* (2013.01); *H04L 12/2816* (2013.01);
(Continued)

(58) Field of Classification Search
CPC combination set(s) only.
See application file for complete search history.

(56) References Cited

U.S. PATENT DOCUMENTS 8,456,293 B1 * 6/2013 Trundle ............. G08B 21/0423
340/517
9,471,654 B1 * 10/2016 Bradley ................ G06F 16/258
(Continued)

FOREIGN PATENT DOCUMENTS

| JP | H06-193899 A | 7/1994 |
| JP | 2004-007297 A | 1/2004 |

(Continued)

OTHER PUBLICATIONS

Yoshida, Chikara et. al., Display Method, Dec. 28, 2012, Panasonic Intellictual Property, Torrance CA (US).*
(Continued)

*Primary Examiner* — Darrin D Dunn
(74) *Attorney, Agent, or Firm* — Posz Law Group, PLC

(57) ABSTRACT

A controller stores an apparatus-room association table in which an apparatus installed in a home is associated with a room in the home, and stores a room-user association table in which the room in the home is associated with the user. The controller determines whether the user is inside the home, and updates a user status. When the user status changes, the controller determines the apparatus correspond- (Continued)

ing to the user whose user status has changed, and controls the determined apparatus to execute a predetermined process based on the apparatus-room association table and the room-user association table.

24 Claims, 12 Drawing Sheets

(52) U.S. Cl.
CPC .. *H04L 12/2829* (2013.01); *G05B 2219/2642* (2013.01); *G08C 2201/112* (2013.01); *G08C 2201/114* (2013.01)

(56) References Cited

U.S. PATENT DOCUMENTS

| | | | |
|---|---|---|---|
| 9,979,198 B2* | 5/2018 | Darden, II | H02J 3/382 |
| 2002/0085578 A1* | 7/2002 | Dell | H04Q 11/0478 370/422 |
| 2004/0225547 A1* | 11/2004 | Yamashima | G06F 1/3203 705/7.12 |
| 2005/0131991 A1* | 6/2005 | Ogawa | H04L 12/2803 709/201 |
| 2005/0154499 A1* | 7/2005 | Aldridge | F02G 1/043 700/286 |
| 2005/0190053 A1* | 9/2005 | Dione | G06Q 10/06 340/500 |
| 2007/0050634 A1* | 3/2007 | Makimoto | G06F 21/32 713/182 |
| 2008/0088452 A1* | 4/2008 | Agrawal | G07C 9/00111 340/572.1 |
| 2008/0209342 A1* | 8/2008 | Taylor | G05B 15/02 715/747 |
| 2008/0275573 A1* | 11/2008 | Shimba | G05B 15/02 700/19 |
| 2008/0281472 A1* | 11/2008 | Podgorny | G05B 15/02 700/276 |
| 2009/0065596 A1* | 3/2009 | Seem | F24F 11/30 236/51 |
| 2009/0207015 A1* | 8/2009 | Diem | G06Q 10/00 340/539.13 |
| 2010/0289643 A1* | 11/2010 | Trundle | F24F 11/0086 340/545.1 |
| 2011/0074542 A1 | 3/2011 | Nabeshima et al. | |
| 2012/0109892 A1* | 5/2012 | Novik | G06F 16/278 707/633 |
| 2012/0200155 A1* | 8/2012 | McDonnell | H02J 3/34 307/18 |
| 2012/0316693 A1* | 12/2012 | Ogawa | H02J 3/14 700/295 |
| 2013/0015703 A1* | 1/2013 | Rouse | H02J 3/38 307/18 |
| 2013/0049607 A1* | 2/2013 | Urata | G08C 17/02 315/153 |
| 2013/0123998 A1* | 5/2013 | King | G06F 1/30 700/292 |
| 2013/0227126 A1* | 8/2013 | Imes | G05B 15/02 709/224 |
| 2013/0234840 A1* | 9/2013 | Trundle | G08C 19/16 340/12.53 |
| 2014/0042811 A1 | 2/2014 | Myamoto et al. | |
| 2014/0074311 A1* | 3/2014 | Kearns | H02J 3/38 700/297 |
| 2015/0039100 A1* | 2/2015 | Yoshida | G08C 17/00 700/19 |
| 2015/0067562 A1* | 3/2015 | Sasaki | G06F 3/04817 715/769 |
| 2015/0070181 A1* | 3/2015 | Fadell | G08B 19/00 340/628 |
| 2015/0088272 A1* | 3/2015 | Drew | H04L 67/10 700/12 |
| 2015/0116106 A1* | 4/2015 | Fadell | G08B 19/005 340/501 |
| 2015/0185725 A1* | 7/2015 | Sasaki | G08C 17/02 700/275 |
| 2015/0247646 A1* | 9/2015 | Song | G05D 23/1902 700/276 |
| 2015/0338116 A1* | 11/2015 | Furuta | H04L 12/2818 700/276 |
| 2016/0047565 A1* | 2/2016 | Robinson | H04L 12/2803 700/278 |
| 2016/0231718 A1* | 8/2016 | Logan | G05B 15/02 |
| 2016/0261425 A1* | 9/2016 | Horton | G05B 15/02 |
| 2017/0003047 A1* | 1/2017 | Grohman | G05B 15/02 |
| 2017/0061750 A1* | 3/2017 | Eyring | G08B 13/19695 |
| 2017/0122613 A1* | 5/2017 | Sinha | G05B 19/048 |
| 2017/0146969 A1* | 5/2017 | Yamada | G06F 13/00 |
| 2017/0147025 A1* | 5/2017 | Darden, II | G05F 1/66 |
| 2017/0191693 A1* | 7/2017 | Bruhn | F24F 11/30 |
| 2017/0211837 A1* | 7/2017 | Gupta | F24F 11/30 |
| 2017/0211838 A1* | 7/2017 | Child | F24F 11/0034 |

FOREIGN PATENT DOCUMENTS

| | | |
|---|---|---|
| JP | 2005-198252 A | 7/2005 |
| JP | 2008-267741 A | 11/2008 |
| JP | 2010-028687 A | 2/2010 |
| JP | 2011-071749 A | 4/2011 |
| JP | 2011-205413 A | 10/2011 |
| JP | 2012-228043 A | 11/2012 |
| JP | 2012226435 A | 11/2012 |
| JP | 2013-070326 A | 4/2013 |

OTHER PUBLICATIONS

Japanese Office Action dated Sep. 27, 2016 in the corresponding JP application No. 2016-019115( Partial English translation attached ).
International Search Report of the International Searching Authority dated Jun. 17, 2014 for the corresponding international application No. PCT/JP2014/059211 (and English translation).
Office Action dated Oct. 15, 2013 issued in corresponding JP patent application No. 2013-105161 (and partial English translation).
Office Action dated Apr. 21, 2015 issued in corresponding JP patent application No. 2014-091628 (and partial English translation).
Office Action dated Jul. 21, 2015 issued in corresponding JP patent application No. 2014-091629 (and partial English translation).
Office Action dated Feb. 14, 2018 issued in corresponding CN patent application No. 201480028593.0 (and English translation thereof).
Office Action dated Jul. 17, 2018 issued in corresponding CN patent application No. 201480028593.0 (and English translation).
Office Action dated Jan. 8, 2019 issued in corresponding Chinese patent application No. 201480028593.0 (and English translation).
Notice of Reexamination dated Jun. 28, 2019 issued in corresponding CN patent application No. 201480028593.0 (and partial English translation).
Notice of Reexamination dated Sep. 27, 2019 issued in corresponding CN patent application No. 201480028593.0 (and partial English translation).

* cited by examiner

FIG. 4A

| IDENTIFICATION NUMBER | FLOOR NUMBER | NAME OF ROOM | SIZE OF ROOM [MAT] | ... |
|---|---|---|---|---|
| 101 | 1 | LIVING ROOM | 12 | ... |
| 102 | 1 | RESTROOM | 1 | ... |
| 103 | 1 | BATHROOM | 2 | ... |
| 104 | 1 | KITCHEN | 6 | ... |
| 201 | 2 | BEDROOM | 6 | ... |
| 202 | 2 | STUDY ROOM | 6 | ... |
| 203 | 2 | CHILD'S ROOM | 6 | ... |
| ... | ... | ... | ... | ... |

BASIC INFORMATION INPUT SCREEN

FLOOR NUMBER: 2

FAMILY CONFIGURATION: ☑ FATHER  ☑ MOTHER  ☐ FIRST SON  ☐ FIRST DAUGHTER

LAYOUT OF FIRST FLOOR

LIVING ROOM: 12 MAT

KITCHEN: 6 MAT

| IDENTIFICATION NUMBER OF ROOM | IDENTIFICATION NUMBER OF APPARATUS | NAME OF APPARATUS | RATED POWER | ... |
|---|---|---|---|---|
| 101 | 0001 | LIGHTING DEVICE | 100W | ... |
|  | 0002 | INDOOR UNIT | 600W | ... |
|  | 0003 | TV | 120W | ... |
|  | 0004 | FLOOR HEATER | 100W | ... |
| ... | ... | ... | ... | ... |
| 201 | 0005 | LIGHTING DEVICE | 80W | ... |
|  | 0006 | INDOOR UNIT | 400W | ... |
|  | 0007 | TV | 100W | ... |
| 202 | 0008 | LIGHTING DEVICE | 100W | ... |
| 203 | 0009 | LIGHTING DEVICE | 100W | ... |
|  | 0010 | PC | 150W | ... |
| ... | ... | ... | ... | ... |

| IDENTIFICATION NUMBER OF ROOM | USER |
|---|---|
| 101 | FATHER, MOTHER, CHILD |
| 102 | FATHER, MOTHER, CHILD |
| 103 | FATHER, MOTHER, CHILD |
| 104 | MOTHER |
| 201 | FATHER, MOTHER |
| 202 | FATHER |
| 203 | CHILD |
| ... | ... |

| SCHEDULE | USER | DETAIL OF SCHEDULE | STARTING DATE AND TIME OF SCHEDULE | ENDING DATE AND TIME OF SCHEDULE | REPEAT |
|---|---|---|---|---|---|
| SCHEDULE X | FATHER | WORK | APRIL 23, 2013, 07:30 | APRIL 23, 2013, 19:30 | ON |
| SCHEDULE Y | MOTHER | SHOPPING | APRIL 23, 2013, 10:00 | APRIL 23, 2013, 12:00 | OFF |
| SCHEDULE Z | CHILD | SCHOOL | APRIL 23, 2013, 08:00 | APRIL 23, 2013, 17:00 | ON |
| ... | ... | ... | ... | ... | ... |

700

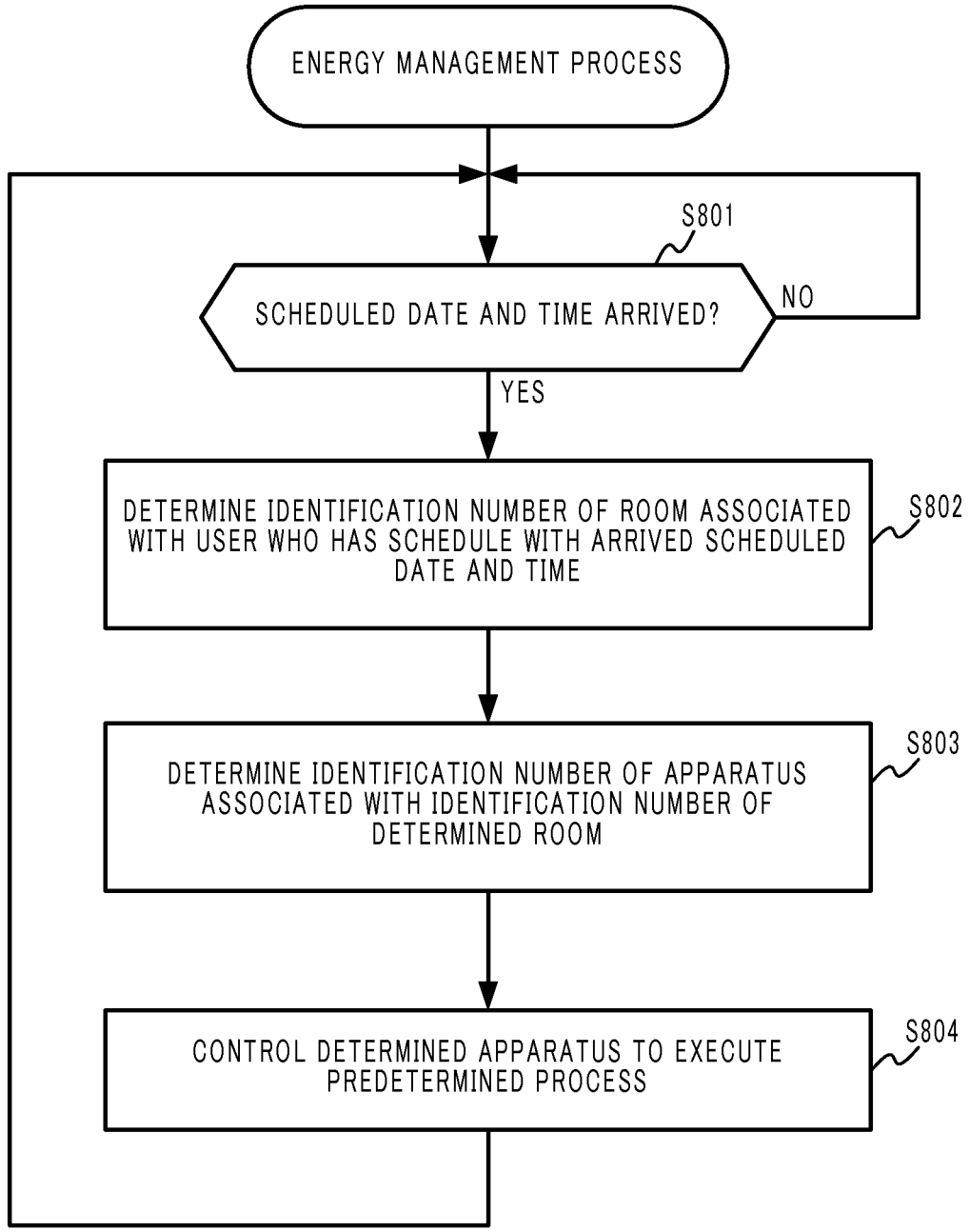

| IDENTIFICATION NUMBER OF ROOM | IDENTIFICATION NUMBER OF APPARATUS | NAME OF APPARATUS | CONTROL PATTERN A | CONTROL PATTERN B | ... |
|---|---|---|---|---|---|
| 101 | 0001 | LIGHTING DEVICE | LIGHT OFF | LIGHT ON | ... |
| | 0002 | INDOOR UNIT | TURN OFF | HEATING, 20°C | ... |
| | 0003 | TV | TURN OFF | TURN ON | ... |
| | 0004 | FLOOR HEATER | TURN OFF | LOW | ... |
| ... | ... | ... | ... | ... | ... |
| 201 | 0005 | LIGHTING DEVICE | LIGHT OFF | LIGHT ON | ... |
| | 0006 | INDOOR UNIT | TURN OFF | DEHUMIDITY | ... |
| | 0007 | TV | TURN OFF | TRUN ON | ... |
| 202 | 0008 | LIGHTING DEVICE | LIGHT OFF | LIGHT ON | ... |
| 203 | 0009 | LIGHTING DEVICE | LIGHT OFF | LIGHT ON | ... |
| | 0010 | PC | SLEEP | NORMAL | ... |
| ... | ... | ... | ... | ... | ... |

FIG. 10

| SCHEDULE | USER | DETAIL OF SCHEDULE | STARTING DATE AND TIME OF SCHEDULE | STARTING CONTROL PATTERN | ENDING DATE AND TIME OF SCHEDULE | ENDING CONTROL PATTERN |
|---|---|---|---|---|---|---|
| SCHEDULE X | FATHER | WORK | APRIL 23, 2013, 07:30 | A | APRIL 23, 2013, 19:30 | B |
| SCHEDULE Y | MOTHER | SHOPPING | APRIL 23, 2013, 10:00 | A | APRIL 23, 2013, 12:00 | B |
| SCHEDULE Z | CHILD | SCHOOL | APRIL 23, 2013, 08:00 | A | APRIL 23, 2013, 17:00 | NULL |
| ... | ... | ... | ... | ... | ... | ... |

| USER | IDENTIFICATION INFORMATION OF TERMINAL DEVICE |
|---|---|
| FATHER | XX-XX-XX-XX-XX-XX |
| MOTHER | YY-YY-YY-YY-YY-YY |
| CHILD | ZZ-ZZ-ZZ-ZZ-ZZ-ZZ |
| ... | ... |

US 10,838,379 B2

HOME ENERGY MANAGEMENT AND CONTROL SYSTEM, CONTROLLER, AND METHOD BASED ON USER OCCUPANCY AND NON-TRANSITORY COMPUTER-READABLE RECORDING MEDIUM

CROSS REFERENCE TO RELATED APPLICATION

This application is a U.S. national stage of International Patent Application No. PCT/JP2014/059211 filed on Mar. 28, 2014, which claims priority to Japanese Patent Application No. 2013-105161 filed on May 17, 2013, the contents of which are incorporated herein by reference.

TECHNICAL FIELD

The present disclosure relates to an energy management controller, an energy management system, an energy management method, and a program which properly control an apparatus according to individual circumstances of a user.

BACKGROUND ART

Systems are known which control electrical energy consumed in a home (consumer's home). For example, Patent Literature 1 discloses a home energy management system (HEMS) which is installed in a consumer's home having power supplying means which is autonomously operable, and at least one load, and which controls both the power supplying means and the load.

In addition, Patent Literature 2 discloses a network system that enables, when a user installs a new apparatus in a home, the user to intuitively input settings of an installation location by a simple operation. This network system acquires, when determining that the apparatus is newly connected with a home network, a corresponding icon image, and displays the icon image in a manner overlaid on the surrounding position of a room layout image.

CITATION LIST

Patent Literature

Patent Literature 1: Unexamined Japanese Patent Application Kokai Publication No. 2012-228043
Patent Literature 2: Unexamined Japanese Patent Application Kokai Publication No. 2005-198252

SUMMARY OF INVENTION

Technical Problem

Although an association between a room and the apparatus is made by displaying the overlaid icon image, this does not help to specify a main user of the apparatus. Hence, the problem exists that the apparatus cannot be controlled properly according to the activity of the user.

The present disclosure has been made in view of the aforementioned circumstances, and it is an objective of the present disclosure to properly control apparatus according to the individual circumstances of a user.

Solution to Problem

In order to accomplish the above objective, an energy management controller according to the present disclosure includes:

a table storage configured to prestore an apparatus-room association table in which an apparatus installed in a home is associated with a room in the home, and to prestore a room-user association table in which a room in the home is associated with a user;

a determiner configured to determine whether the user is inside the home, and to determine, when a user status that indicates whether the user is inside or outside the home changes, an apparatus corresponding to the user whose user status has changed, based on the apparatus-room association table and the room-user association table; and an apparatus controller configured to control the apparatus determined by the determiner to execute a predetermined process.

Advantageous Effects of Invention

Proper control of apparatus according to the individual circumstances of a user can be possible.

BRIEF DESCRIPTION OF DRAWINGS

FIG. 4A is a diagram illustrating an example structure of a layout defining table;
FIG. 4B is a diagram illustrating an example structure of a basic information input screen;
FIG. 8 is a flowchart for explaining an energy management process;
FIG. 9 is a diagram illustrating an example structure of an apparatus-room association table;
FIG. 10 is a diagram illustrating an example structure of a schedule table;
and
FIG. 11 is a diagram illustrating an example structure of a terminal device-and-user association table.

DESCRIPTION OF EMBODIMENTS

Embodiments of the present disclosure will be described below with reference to the figures.

First Embodiment

Figure 1:
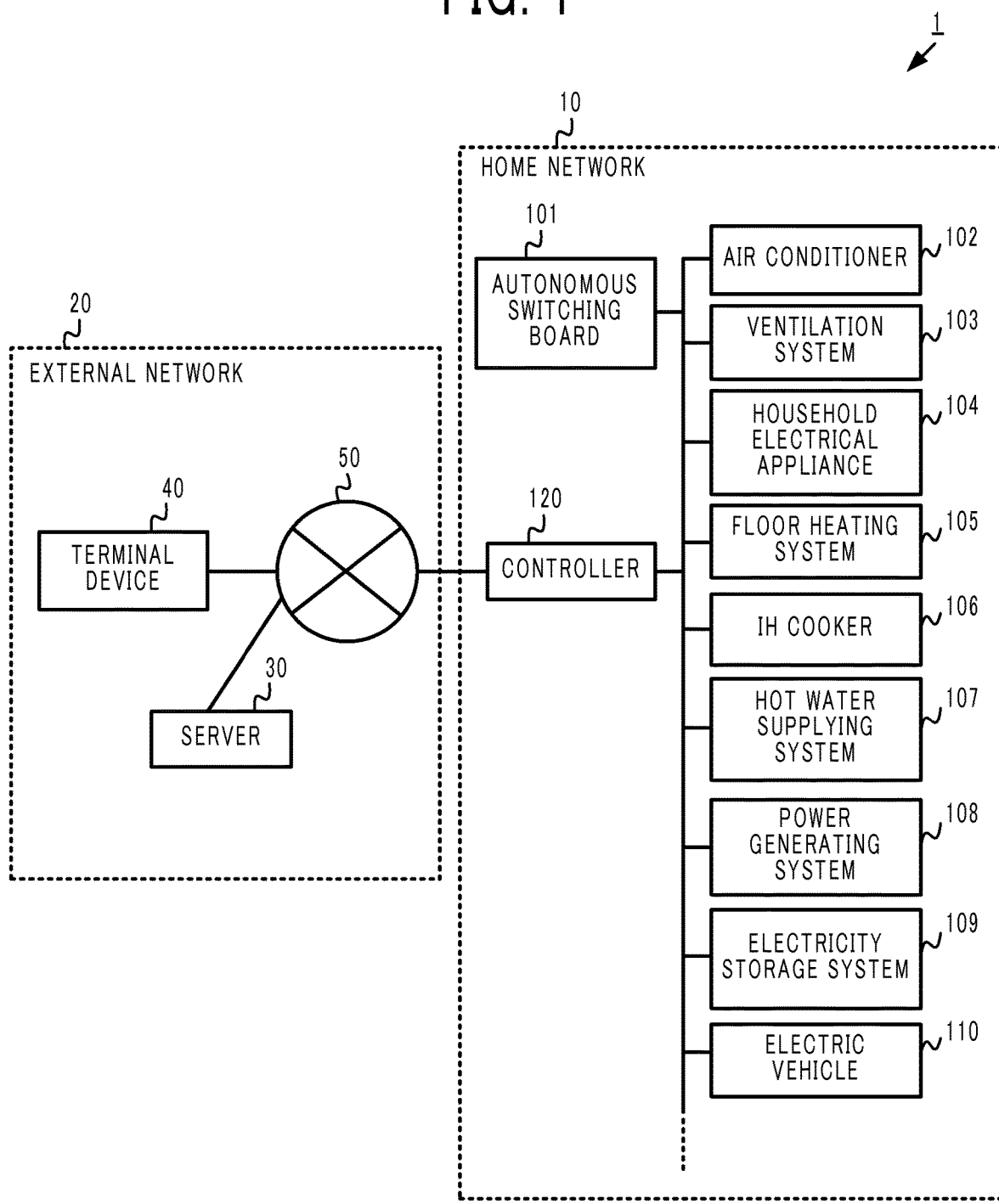
FIG. 1 is a diagram illustrating a structure of an energy management system.

FIG. 1 illustrates a structure of an energy management system 1 according to this embodiment. The energy management system 1 monitors electric energy consumed by various apparatuses and systems installed in a home (consumer's home), and controls the operation of individual apparatuses and systems. For example, a home network 10 includes an autonomous switching board 101, an air conditioner 102, an ventilation system 103, other household electrical apparatus 104 such as a television receiver and lighting device, a floor heating system 105, an induction heating (IH) cooker 106, and a hot water supplying system 107.

In addition, the home network 10 includes a power generating system 108 that utilizes, for example, solar power, an electricity storage system 109 that includes batteries, an electric vehicle 110 which can be disconnected as needed and which includes batteries, and a controller 120.

A home power line (unillustrated) of the energy management system 1 is connected, through the autonomous switching board 101, to a commercial power supply from an electricity company.

The autonomous switching board 101, the air conditioner 102, the ventilation system 103, the household electrical appliance 104, the floor heating system 105, the IH cooker 106, the hot water supplying system 107, the power generating system 108, the electricity storage system 109, the electric vehicle 110, and the controller 120 are all connected to the home power line, and powered from at least one of the a commercial power source, the power generating system 108, the electricity storage system 109, and the electric vehicle 110.

In addition, each apparatus or system includes an unillustrated wireless communication device, and is communicable wirelessly. However, some or all of the communications may be performed in a wired manner. In the following description, an apparatus or a system to be controlled by the energy management system 1 is simply referred to as an "apparatus".

Still further, unillustrated power measuring devices are installed at multiple locations on the home power line in the energy management system 1, and thus electric energy, and the like consumed by the air conditioner 102, the ventilation system 103, the household electrical appliance 104, the floor heating system 105, the IH cooker 106, the hot water supplying system 107, the power generating system 108, and the electricity storage system 109 can be measured as needed. A measurement result is transmitted to the controller 120.

The home network 10 is connected to an external network 20 that comprises a server 30, a terminal device 40, and a communication network 50. A typical communication network 50 is the Internet. A user can operate each apparatus within the home network 10 by a remote operation through the terminal device 40 within the external network 20.

The terminal device 40 is accessible to the home network 10 and the external network 20 through wireless communication. An example terminal device 40 is a mobile phone, a personal computer, or a tablet-type terminal. The user can carry to operate the terminal device 40 not only inside the home but also at a location outside the home.

The operating mode of the energy management system 1 can be generally divided into two operating modes. The one mode is an interconnection mode in which the in-home power line is connected to the commercial power source through the autonomous switching board 101, and electric power is supplied from the commercial power source. In the interconnection mode, electric power generated by the power generating system 108 can be supplied to the commercial power source, or can be sold.

The other mode is an autonomous operating mode in which the home power line is disconnected from the commercial power source through the autonomous switching board 101, and electric power generated by the power generating system 108, and/or electric power stored in the electricity storage system 109, and/or power stored in the electric vehicle 110 is supplied to the home without electric power from the commercial power source.

The operating mode is switched by the autonomous switching board 101 based on a detection result that is detected by the autonomous switching board 101 and that indicates the power supply status from the commercial power source. Typically, the mode is set to the interconnection mode while the power failure does not occur in the commercial power source, and when a power failure is detected in the commercial power source, the mode is switched to the autonomous operating mode.

Figure 2:
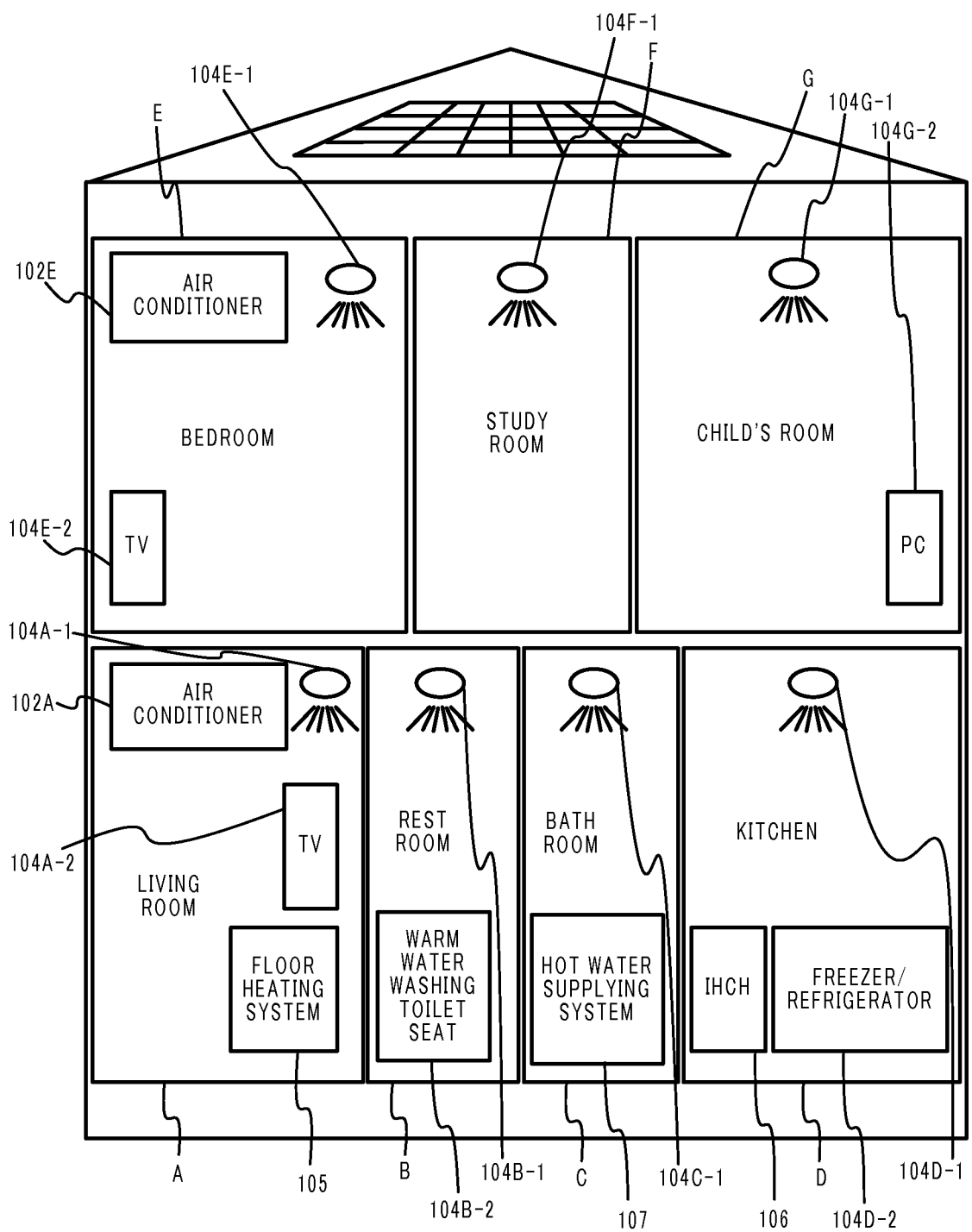
FIG. 2 is a diagram illustrating an example of a room layout in a home and an arrangement of electrical appliances therein.

Each apparatus and system installed in the home illustrated in FIG. 1 is installable at any location within the home. FIG. 2 illustrates an example layout (room layout) of rooms in the home, and an example arrangement of household electrical apparatus 104 and the like installed therein. As illustrated in FIG. 2, the home of this embodiment includes seven spaces that are a living room A, a restroom B, a bathroom C, a kitchen D, a bedroom E, a study room F, and a child's room G. Various household electrical apparatuses are installed in the respective spaces.

A lighting device 104A-1, an air conditioner 102A, a television receiver (indicated as "TV" in FIG. 2) 104A-2, and the floor heating system 105 that heats the floor with electrical power, and the like, are installed in the living room A.

A lighting device 104B-1 and a warm water washing toilet seat 104B-2, and the like, are installed in the restroom B.

A lighting device 104C-1 and the hot water supplying system 107, and the like, are installed in the bathroom C.

A lighting device 104D-1, the IH cooker (indicated as "IHCH" in FIG. 2) 106, and a freezer/refrigerator 104D-2, and the like, are installed in the kitchen D.

A lighting device 104E-1, an air conditioner 102E, and a television receiver 104E-2, and the like, are installed in the bedroom E.

A lighting device 104F-1, and the like, is installed in the study room F.

A lighting device 104G-1 and a personal computer (indicated as "PC" in FIG. 2) 104G-2, and the like, are installed in the child's room G.

Each apparatus illustrated in each room A-G communicates with the controller 120, and the operation of each apparatus can be controlled by the controller 120.

The layout, the kind of apparatus installed in each room, the number of apparatuses, and the installation location of the apparatus as illustrated in FIG. 2 are merely examples, and are not limited by the present disclosure.

Figure 3:
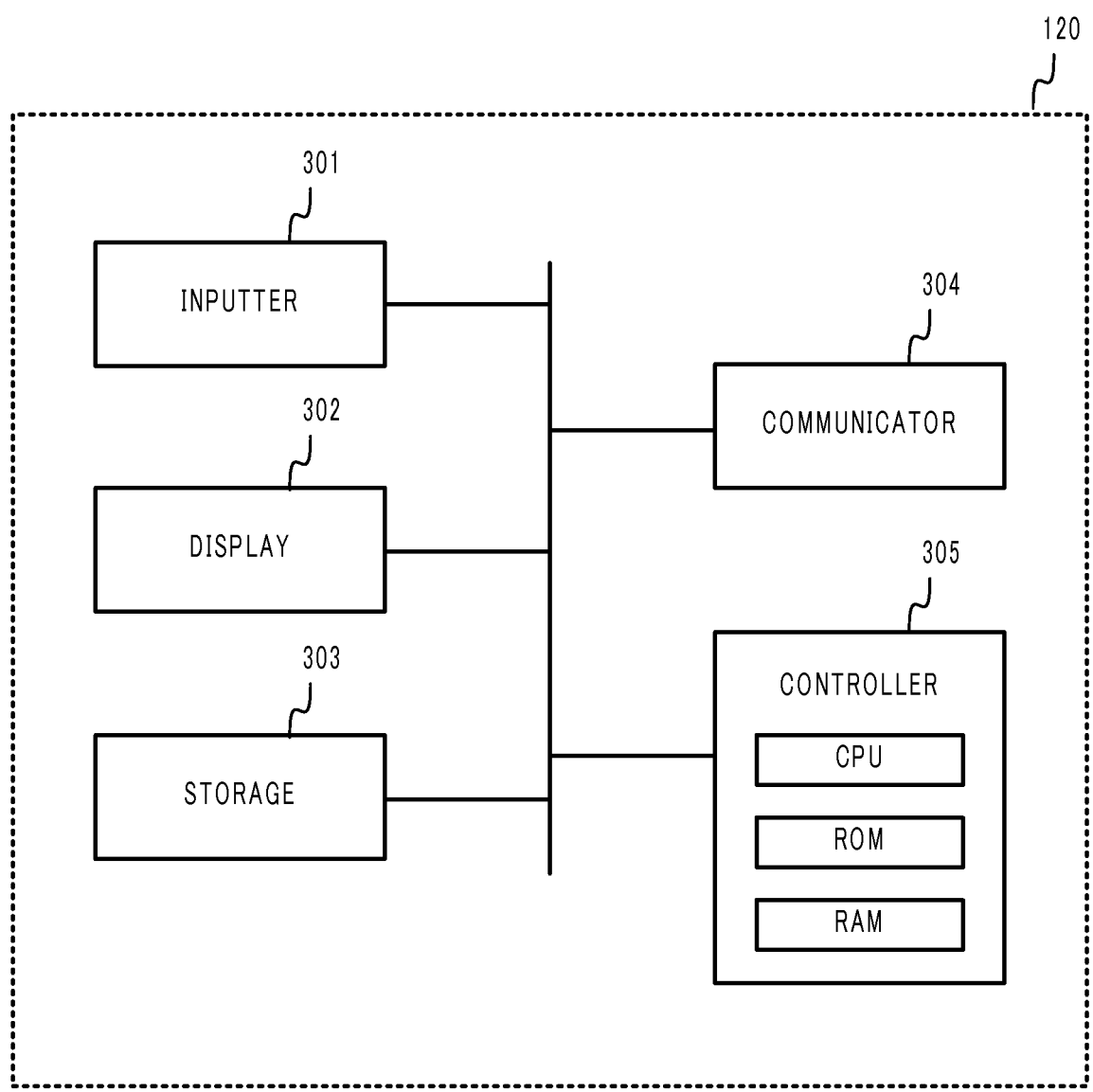
FIG. 3 is a diagram illustrating a structure of a controller.

Next, a structure of the controller 120 will be described with reference to FIG. 3 and the like. The controller 120 monitors and controls the entire energy management system 1.

An inputter 301 includes input devices, such as buttons, a keyboard, and a touch panel. The inputter 301 accepts an input of an instruction given by the user.

A display 302 includes a display device such as a liquid crystal display.

A storage 303 includes a non-volatile memory. The storage 303 stores, in addition to programs to be executed by a controller 305, a layout defining table that defines a layout of the rooms in the home, an apparatus-room association table that defines an installation location (room) in the home of each apparatus to be controlled by the controller 120, and a room-user association table that defines an association between the room and the user. The details of the tables will be explained later.

A communicator 304 includes a network interface card (NIC), and wirelessly communicates with each apparatus within the energy management system 1.

The controller 305 includes, for example, a central processing unit (CPU), a read only memory (ROM) for storing programs for an operating system and the like, a random access memory (RAM) that serves as a work area, and the like. The controller 305 executes the programs stored in the storage 303, and controls the whole controller 120.

For example, the controller 305 detects a user status indicating whether the user is inside the home, stores a detection result in the storage 303, and updates the result as needed.

A typical server, mainframe, personal computer, or the like is applicable as the controller 120.

FIG. 4A illustrates an example structure of a layout defining table 400 stored in the storage 303 of the energy management system 1 installed in a two-story single-family home. The layout defining table 400 contains an identification number of a room, a floor number of a room, a name of a room, and a size of a room in association with one another. The controller 305 is capable of changing the layout defining table 400 as needed based on an input given by the user.

The controller 305 can generate a schematic diagram of a building as illustrated in FIG. 2 based on the layout defining table 400 and template image data that represents an external appearance or the like of the building, and display the generated diagram on the display. The schematic diagram may not faithfully represent the reality exactly, but such a diagram may be enough for the user to visually recognize a room where the apparatus is installed. The scheme of generating the schematic diagram by the controller 305 is not limited by the present disclosure.

FIG. 4B illustrates an example structure of a screen for accepting an input of basic information from the user in the energy management system 1. This screen is displayed on the display at the time when, for example, the energy management system 1 is set up. The user inputs basic information, such as the layout and a family structure. The controller 305 generates or updates the layout defining table 400 based on the input details.

Figure 5A:
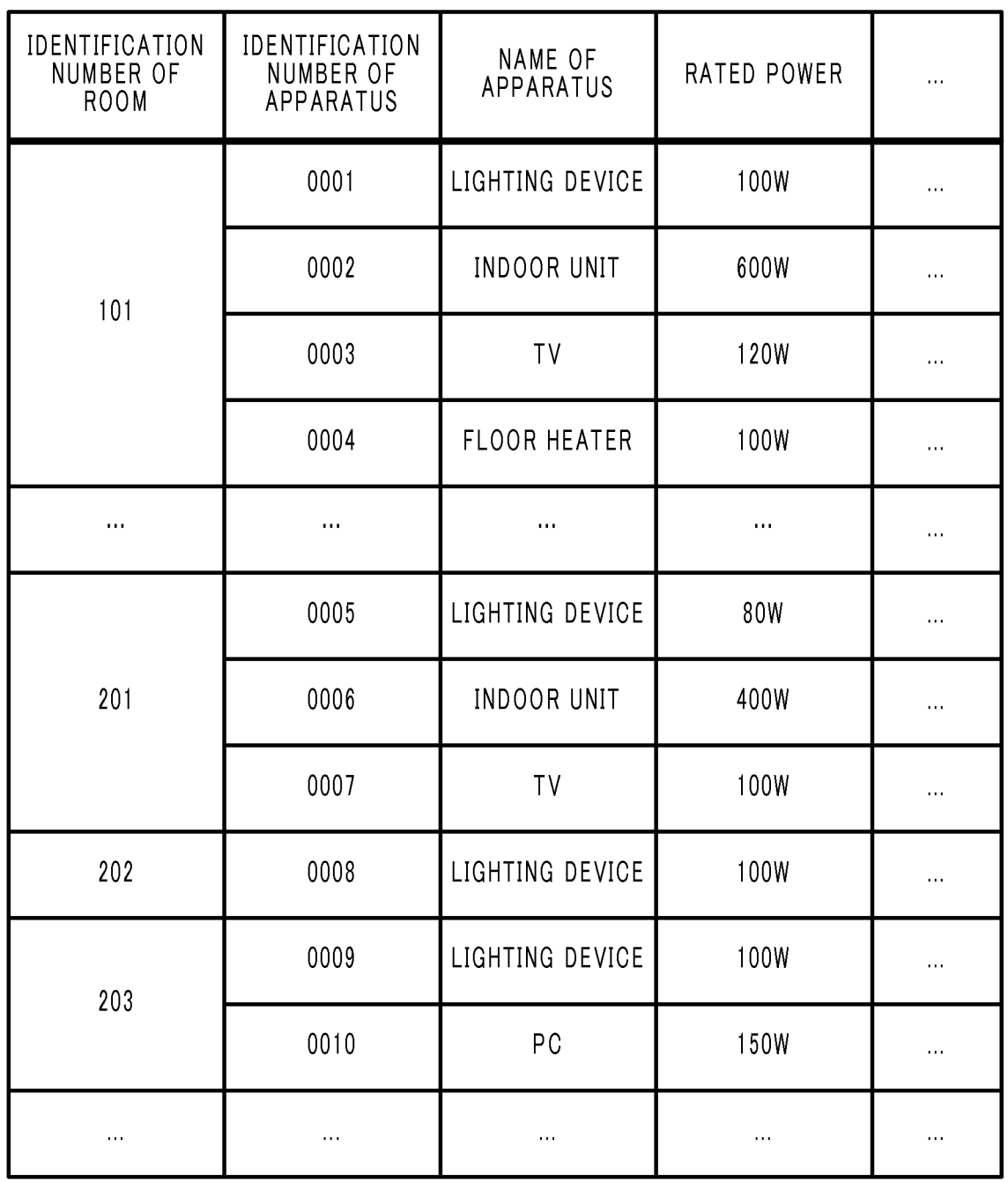
FIG. 5A is a diagram illustrating an example structure of an apparatus-room association table.

FIG. 5A illustrates an example structure of an apparatus-room association table 500. The apparatus-room association table 500 contains, in association with the identification number of a room, an identification number of an apparatus installed in the room, and a name of the apparatus. The apparatus-room association table 500 may further contain a characteristic value such as the rated power of the apparatus.

When, for example, the user purchases an apparatus and installs the apparatus in a room, the user operates the controller 120 to display a screen to edit the apparatus-room association table 500, and inputs the name of a room where the apparatus is installed, the name of the installed apparatus, and the like. The controller 305 changes the apparatus-room association table 500 as needed based on the input given by the user.

Figure 5B:
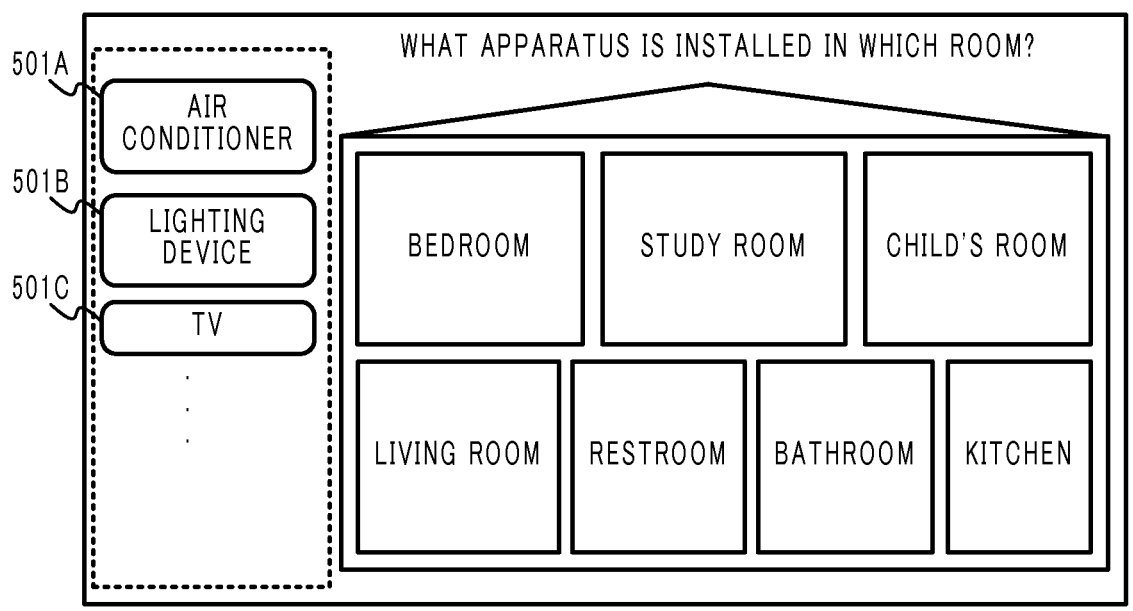
FIG. 5B is a diagram illustrating an example structure of a screen for inputting an association between a room and an apparatus.

FIG. 5B illustrates an example structure of a screen for accepting, from the user, an input for an association between a room and an apparatus. For example, the user drags and moves an icon 501 (three icons 501A, 501B, and 501C in this figure) that represents an apparatus into a frame that represents the room where the apparatus is installed. The controller 305 generates or updates the apparatus-room association table 500 based on the input details through this screen.

The controller 120 may accept, from the user, an input of a model number of the apparatus and the serial number thereof, and transmit the input information to a server (unillustrated) on the Internet. The server may acquire, from a database, a characteristic value such as the rated power of the apparatus corresponding to the model number or the serial number, and transmit the acquired value to the controller 120. The controller 120 may update the apparatus-room association table 500 with the characteristic value acquired from the server.

Figure 6A:
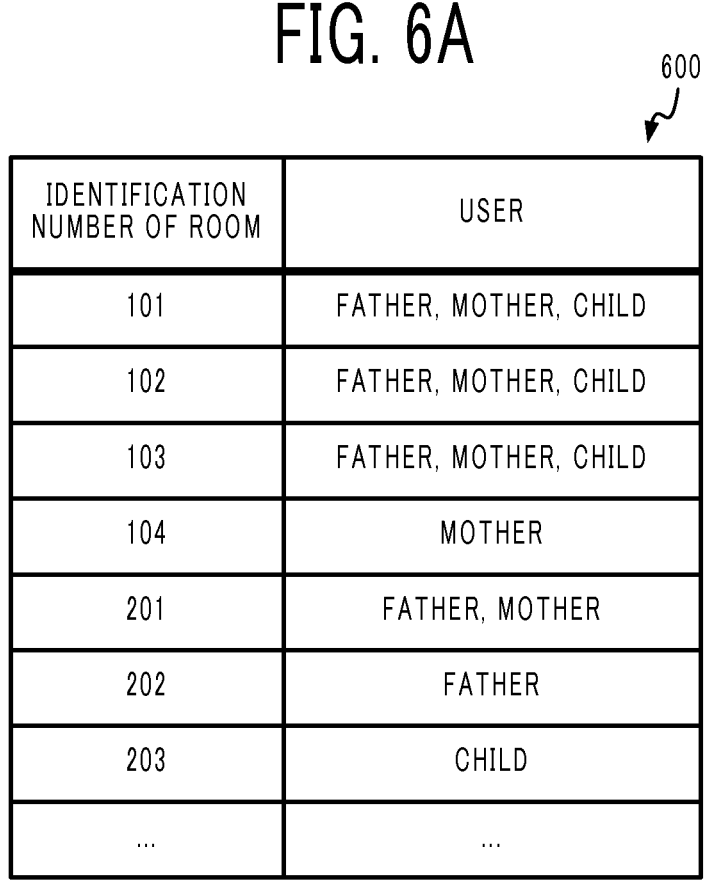
FIG. 6A is a diagram illustrating an example structure of a room-user association table.

FIG. 6A illustrates an example structure of a room-user association table 600. The room-user association table 600 contains, in association with the identification number of a room, information on a person that mainly uses the room. For example, the room with the identification number "101" is associated with three persons who are "father", "mother", and "child".

Figure 6B:
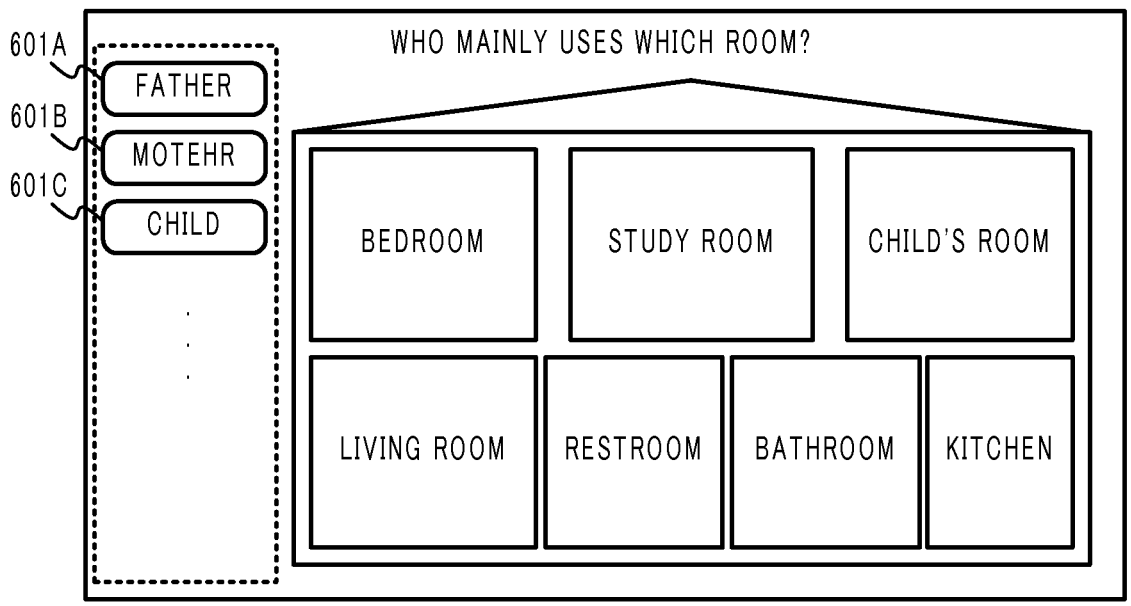
FIG. 6B is a diagram illustrating an example structure of a screen for inputting an association between a room and a user.

FIG. 6B illustrates an example structure of a screen for accepting, from the user, an input for an association between a room and a user. For example, the user drags and moves an icon 601 (three icons 601A, 601B, and 601C in this figure) that represents a user into a frame that represents the room where the apparatus is installed. The controller 305 generates or updates the room-user association table 600 based on the input details through this screen.

When the apparatus-room association table 500 and the room-user association table 600 are combined together, an association between the apparatus and the user can be acquired since the identification number of the room is a common element therebetween.

Specifically, the apparatus-room association table 500 in FIG. 5A shows that the room with the identification number "101" is associated with lighting device with an identification number "0001", indoor unit with an identification number "0002", a television receiver (TV) with an identification number "0003", and a floor heating system with an identification number "0004". In addition, the room-user association table 600 in FIG. 6A shows that the room with the identification number "101" is associated with a father, a mother, and a child. Therefore, the controller 305 can determine that the four apparatuses which are the lighting device with the identification number "0001", the indoor unit with the identification number "0002", the television receiver (TV) with the identification number "0003", and the floor heating system with the identification number "0004" are associated with three persons who are the father, the mother, and the child.

Likewise, for all apparatuses, the controller 305 can determine the user associated with the apparatus.

In general, the layout defining table 400 illustrated in FIG. 4A and the room-user association table 600 illustrated in FIG. 6A are not frequently changed, and thus the user does not need to change the tables once inputting the information unless the home is re-constructed or the user moves out to another home. In addition, as for the apparatus-room association table 500 illustrated in FIG. 5A, it is necessary for the user to change the table only when the user purchases a new apparatus or replaces the apparatus, and thus the user does not need to frequently change this table. The user has many opportunities to be aware of who mainly uses which room (that is, the details of the room-user association table 600), and which room is whose (that is, the details of the apparatus-room association table 500), but has little opportunity to be aware of who mainly uses which apparatus. In particular, it is unusual to let the user previously provide a direct input of an association between the apparatus and the main user thereof in the household. When, however, the layout defining table 400, the apparatus-room association table 500 and the room-user association table 600 of this embodiment are applied, the controller 120 can easily determine an association between the apparatus and the user without burdening the user.

When the association between the apparatus and the user is determined, the energy management system 1 enables power consumption and operating of the apparatus to be finely managed in accordance with, for example, a life pattern of the user. For example, the energy management system 1 can manage energy more efficiently based on the action schedule of each member of a family, such that when the father has a schedule of being out, the lighting in the study room is automatically turned off at the scheduled time.

Figures 7A, 7B:
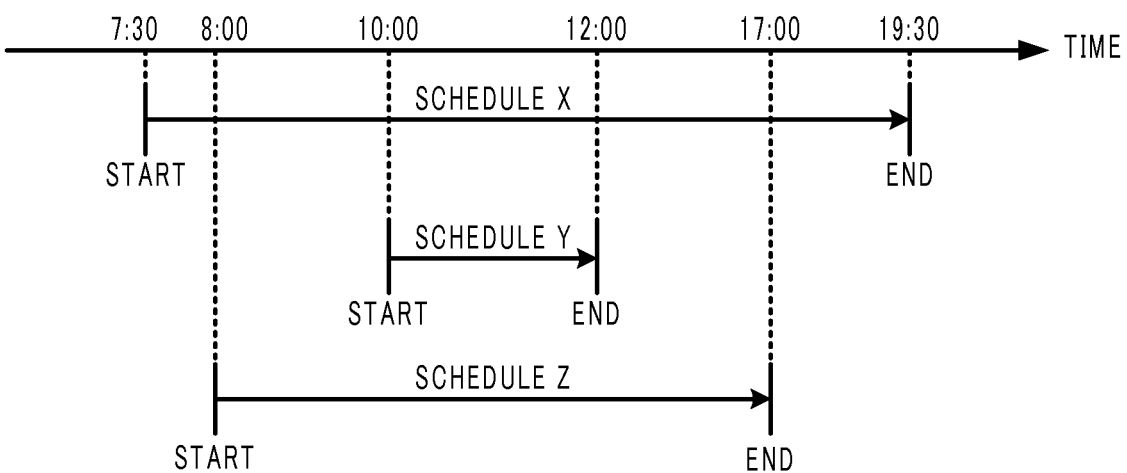
FIG. 7A is a diagram illustrating an example structure of a schedule table.
FIG. 7B is a diagram illustrating a starting date and time and an ending date and time of a schedule that is set in the schedule table.

FIG. 7A illustrates an example structure of a schedule table 700. An entry in the schedule table 700 is made by the user through the inputter 301 of the controller 120, or with a personal computer, a mobile terminal, or the like that is communicable with the controller 120, and the schedule table 700 is stored in the storage 303. A schedule is associated with the user, the detail of the schedule, a starting date and time of the schedule, an ending date and time of the schedule, and a flag indicating whether a repeat of the schedule is set. The repeat setting of the schedule is freely selected such as on a daily, weekdays-only, or weekends-only basis.

FIG. 7B illustrates a starting date and time and an ending date and time for each of a schedule X, a schedule Y, and a schedule Z set in the schedule table 700.

For example, the schedule table 700 contains schedule X for the father who goes out from Apr. 23, 2013, 07:30 to Apr. 23, 2013, 19:30. The controller 305 determines that the study room with the identification number 202 is associated with only the father who is the user indicated by schedule X. When the lighting device 104F-1 associated with the determined study room is left turned on at the starting date and time of schedule X, the controller 305 controls the lighting device 104F-1 to be turned off.

The controller 305 excludes, from the determination result, a room associated with not only the father but also the mother and/or the child (that is, excludes the living room with the identification number "101", the restroom with the identification number "102", the bathroom with the identification number "103", and the bedroom with the identification number "201"). Although the lighting device 104A-1, the air conditioner 102A, the television receiver 104A-2, and the floor heating system 105 that are associated with the living room, the lighting device 104B-1 and the warm water washing toilet seat 104B-2 that are associated with the restroom, the lighting device 104C-1 and the hot water supplying system 107 that are associated with the bathroom, and, the air conditioner 102E, the lighting device 104E-1, and the television receiver 104E-2 that are associated with the bedroom are turned on, the controller 305 does not turn off such apparatus.

In addition, there is also schedule Z for the child who is out from Apr. 23, 2013, 08:00 to Apr. 23, 2013, 17:00. The controller 305 determines that the child's room with the identification number "203" is associated with the child only. The controller 305 controls the lighting device 104G-1 and the personal computer 104G-2 both associated with the child's room, to be turned off at the starting date and time of schedule Z.

Since the time period of schedule Z is completely included within the time period of schedule X, the father and the child are out within the time period of schedule Z. When there is a room associated with only the two persons who are the father and the child, the controller 305 determines such a room, and controls the apparatus associated with the determined room, to be turned off.

The controller 305 excludes, from the determination result, a room associated with not only the child but also the mother (that is, the living room with the identification number "101", the restroom with the identification number "102", and the bathroom with the identification number "103"). Although the lighting device 104A-1, the air conditioner 102A, the television receiver 104A-2, and the floor heating system 105 that are associated with the living room, the lighting device 104B-1 and the warm water washing toilet seat 104B-2 that are associated with the restroom, the lighting device 104C-1 and the hot water supplying system 107 that are associated with the bathroom are all turned on, the controller 305 does not turn off such apparatus.

Still further, the schedule table 700 contains schedule Y for the mother who is out from Apr. 23, 2013, 10:00 to Apr. 23, 2013, 12:00. The controller 305 determines that the kitchen with the identification number "104" is associated with the mother who is the user indicated by schedule Y. The controller 305 controls the lighting device 104D-1, the freezer/refrigerator 104D-2, and the IH cooker 106 all associated with the determined kitchen so as to be turned off at the starting date and time of schedule Y.

The controller 305 may not, exceptionally, turn off an apparatus that is desirably always turned on, such as the freezer/refrigerator 104D-2. Whether to always turn on the equipment is set beforehand by the user or the controller 305.

Since the time period of schedule Y completely overlaps the time periods of schedule X and schedule Z, all of the three persons who are the father, the mother, and the child are out within the time period of schedule Y. The controller 305 controls all apparatuses so as to be turned off at the starting date and time of schedule Y.

During the time period from Apr. 23, 2013, 08:00 to Apr. 23, 2013, 10:00, and the time period from Apr. 23, 2013, 12:00 and Apr. 23, 2013, 17:00, the two persons who are the father and the child are out but the mother stays at home. If there is a room associated with only the two persons who are the father and the child, the controller 305 controls the apparatus associated with the room associated with only the two persons who are the father and the child so as to be turned off during those time periods.

As explained above, when the value of the user status changes from the value indicating that the user is at home to the value indicating that the user is out, the controller 305 determines the room associated with only the user who has the changed user status, and controls the apparatus associated with the determined room.

In addition, the controller 305 is capable of controlling the apparatus according to whether the user is at home. The controller 305 can not only turn off the apparatus but also turn on the apparatus according to the user status.

When the ending date and time of schedule Y arrives, the mother comes home and the father and the child are still out. The controller 305 determines that the kitchen with the identification number "104" is associated with only the mother. In this case, the controller 305 may perform control so as to turn on the lighting device 104D-1, the freezer/refrigerator 104D-2, and the IH cooker 106 all associated with the kitchen.

Still further, the controller 305 may perform control so as to turn on the apparatus associated with the room associated with at least the mother. For example, the living room with the identification number "101" is associated with the father, the child, and also the mother. When the ending date and time of schedule Y arrives, the controller 305 may turn on the lighting device 104A-1, the air conditioner 102A, the television receiver 104A-2, and the floor heating system 105 all associated with the living room. The same is true of the restroom with the identification number "102", the bathroom with the identification number "103", and the bedroom with the identification number "201". When there is apparatus already turned on, the controller 305 may not control such apparatus.

When the ending date and time of schedule Z comes, the child comes home, and only the father is still out. The controller 305 determines that the child's room with the identification number "203" is associated with the child only. In this case, the controller 305 may perform control so as to turn on the lighting device 104G-1 and the personal computer 104G-2 both associated with the child's room.

In addition, the controller 305 may perform control so as to turn on the apparatus associated with the room associated with at least the child. For example, the living room with the identification number "101" is also associated with the child. Hence, when the ending date and time of schedule Y arrives, the controller 305 may turn on the lighting device 104A-1, the air conditioner 102A, the television receiver 104A-2, and the floor heating system 105 all associated with the living room with the identification number "101". The same is true of the restroom with the identification number "102", and the bathroom with the identification number "103". When there is apparatus already turned on, the controller 305 may not control such apparatus.

When the ending date and time of schedule X arrives, the father comes home. The controller 305 determines that the study room with the identification number "202" is associated with the father only. The controller 305 may control the lighting device 104F-1 associated with the study room so as to be turned on.

After the ending date and time of schedule X has arrived, all members who are the father, the mother, and the child are at home. The controller 305 may control the equipment associated with the room associated with at least one of the father, the mother, and the child so as to be turned on.

As explained above, when the user status changes from the value indicating that the user is out to the value indicating that the user is at home, the controller 305 determines the room associated with at least the user who has the changed user status, thereby controlling the apparatus associated with the determined room.

The controller 305 may control the apparatus to perform an arbitrary action other than turning on or off the apparatus.

Next, an energy management process executed by the energy management system 1 of this embodiment is described with reference to the flowchart of FIG. 8. The flowchart does not clearly show that the controller 305 of the controller 120 includes a built-in clock that performs timekeeping of the current date and time, and always keeps the current date and time simultaneously with the energy management process.

First, the controller 305 reads the schedule table 700 stored in the storage 303, and determines whether the clock's current date and time reaches the scheduled date and time set in the schedule table 700 (step S801). When, for example, schedules are scheduled in the schedule table 700 as illustrated in FIG. 7A, the controller 305 determines whether the current date and time reaches any of the starting dates and times of the three schedules.

When determining that the clock's current date and time does not reach the set and scheduled date and time yet (step S801: NO), the controller 305 repeats the process in the step S801. Conversely, when determining that the clock's current date and time reaches the set and scheduled date and time (step S801: YES), the controller 305 determines the user associated with the schedule based on the schedule table 700, determines that the user status of the user is changing, and further determines the identification number of the room associated with the determined user based on the room-user association table 600 (step S802).

In this embodiment, however, when the identification number of the determined room is also associated with a user other than the determined user, the controller 305 excludes the identification number of such a room also associated with the other user. When, for example, the schedule that has the arrived starting date and time is "schedule X", the controller 305 determines that the user associated with this schedule X is the father, and acquires, based on the room-user association table 600, the identification number "202" of the room associated with the father only. The controller 305 excludes the identification numbers "101", "102", "103", and "201" which are associated with the father and also associated with the other user.

The controller 305 determines the identification number of the apparatus associated with the identification number of the room determined in step S802 based on the apparatus-room association table 500 (step S803).

For example, in the apparatus-room association table 500 illustrated in FIG. 5A, when the identification number of the room determined in step S802 is "202", the controller 305 acquires the identification number "0008" of the apparatus (lighting device) associated with the identification number "202" of the room.

Next, the controller 305 executes the predetermined process for the apparatus indicated by the identification number determined in step S803 (step S804).

An example predetermined process is "to turn off". When the apparatus indicated by the identification number determined in step S804 is a lighting device, the controller 305 turns off this lighting device to turn the lighting device out. However, the specific details of the predetermined process are not limited by the present disclosure, and are freely selected.

When the controller 305 acquires the identification numbers of multiple apparatuses in step S803, the controller 305 executes the predetermined process for all of the apparatuses. In addition, the predetermined process may differ from apparatus to apparatus.

According to this embodiment, the energy management system 1 can properly control the apparatus according to the individual circumstances of the user. When the user previously inputs a personal schedule, wasteful power consumption may be automatically reduced according to the input schedule. If the user forgets to turn off the lighting device when going out, the energy management system 1 automatically turns off this lighting device. Accordingly, an efficient and well-kept energy control is realizable.

When, in step S802, there are multiple users associated with the determined schedule, the controller 305 acquires the identification number of the room associated with each of the multiple users, and the identification number of the room associated with all of the multiple users.

When, for example, the users determined in step S802 are both father and mother, the controller 305 acquires three identification numbers which are (1) the identification number "201" of the room associated with both father and mother, (2) the identification number "202" of the room associated with the father only, and (3) the identification number "104" of the room associated with only the mother, from the room-user association table 600 illustrated in FIG. 6A. However, the identification numbers "101", "102", and "103" of the rooms associated with both the father and the mother and also the child are excluded from the control target in step S804.

Second Embodiment

Next, a second embodiment is described. According to this embodiment, an energy management system 1 enables a determined apparatus to execute an operation freely selected and set by the user at both of or either the starting date and time and the ending date and time registered by the user.

FIG. 9 illustrates an example structure of an apparatus-room association table 900. Unlike the apparatus-room association table 500 illustrated in FIG. 5A, the apparatus-room association table 900 of this embodiment contains, in association with the identification number of the room, information that specifies at least a control pattern. In the example illustrated in FIG. 9, two different control patterns are stored. The number of control patterns associated with each apparatus is freely selected.

For example, the lighting device with the identification number "0001" is set with a control pattern A to turn off a light, and a control pattern B to turn on a light. When the current date and time reaches the starting date and time or the ending date and time of the schedule, the controller 305 of the controller 120 turns off the lighting device with the identification number "0001" when the control pattern A is specified, and turns on the lighting device with the identification number "0001" when the control the control pattern B is specified.

Typically, when the user status indicated by the schedule changes from the value indicating that the user is at home to the value indicating that the user is out, the control pattern A to control the lighting device to be turned out is specified. According to this setting, when the user goes out, the lighting device is automatically turned out. However, the process that is executable when the user goes out from the home is not limited to this process, and is optional, such as to turn off the air conditioner 102, to turn off the television receiver, and to change the mode of the personal computer from the normal mode to the sleep mode.

When the user status indicated by the schedule changes from the value indicating that the user is out to the value indicating that the user is at home, the control pattern B to control the lighting device to be turned on is specified. According to this setting, when the user comes home, the lighting device is automatically turned on. However, the process executable when the user comes home from the outside is not limited to this process, and is optional, such as to turn on the air conditioner 102, to turn on the television receiver, and to change the mode of the personal computer from the sleep mode to the normal mode.

The details of operation set by the control pattern are optional. The energy management system 1 may set the control pattern beforehand depending on the kind of apparatus, or the user may freely set the control pattern. When the user is allowed to freely set the control pattern, the inputter 301 may receive an input given by the user, or a terminal (for example, a highly functional mobile phone) communicable through the communicator 304 may receive an input given by the user. The controller 305 may acquire the received input from the user, and may update the apparatus-room association table 900 based on the acquired input.

There may be an apparatus that is not associated with an operation pattern. In this case, this apparatus is not subjected to an automatic operation control according to the schedule of the user. For example, a fixed-line phone, an intercom, a security system, and the like may cause some trouble when turned off, and thus such an apparatus may be excluded from the automatic control setting.

FIG. 10 illustrates an example structure of a schedule table 1000 according to this embodiment. Unlike the schedule table 700 illustrated in FIG. 7A, the schedule table 1000 illustrated in FIG. 10 stores a starting time control pattern that specifies the control to be executed by the controller 120 when the current date and time reaches the starting date and time of the schedule, and an ending time control pattern that specifies the control to be executed by the controller 120 when the current date and time reaches the ending date and time of the schedule.

The starting time control pattern and the ending time control pattern specify any control pattern that is set in the apparatus-room association table 900. When, however, operation control of the apparatus is not required at the starting date and time of the schedule, the controller 305 may set no specific starting time control pattern, or may set, in the starting time control pattern, a value indicating no operation control required. Likewise, when operation control of the apparatus is not required at the ending date and time of the schedule, the controller 305 may set no specific ending time control pattern, or may set, in the ending time control pattern, a value indicating no operation control required.

When, for example, the user registers a schedule of going out, and desires that a room is heated beforehand when going home, the user can set, for example, "heating, temperature XX ° C." in the ending time control pattern for the schedule of going out. As described above, the apparatus is controllable in order to not only accomplish energy saving but also to allow the user to have a more comfortable life.

The specific flow of the energy management process in this embodiment is the same as the flowchart illustrated in FIG. 8, and it is appropriate if the "predetermined process" in step S804 is changed to a "process specified by the starting time control pattern or the ending time control pattern".

When the user status changes from the value indicating that the user is at home to the value indicating that the user is out, the controller 305 determines in step S802 the room associated with only the user whose user status has changed. When another user other than the determined user is also associated with the room, the controller 305 excludes the room also associated with the user other than the determined user.

For example, when, in the room-user association table 600 illustrated in FIG. 6A, the user who has the changed user status is the father, the controller 305 determines that the room with the identification number "202" is associated with only the father. Next, the controller 305 determines that the apparatus with the identification number "0008" is the apparatus to be controlled and associated with the room that has the identification number "202".

The room also associated with the mother and/or the child in addition to the father is excluded. The room with the identification number "101" is also associated with the mother and the child in addition to the father. The room with the identification number "101" is determined when the three users who are the father, the mother, and the child have the respective user statuses changed to the same value.

The room with the identification number "101" is associated with the three users who are the father, the mother, and the child. When all three users who are the father, the mother, and the child go out, the controller 305 controls the apparatus associated with the room that has the identification number "101" to execute the predetermined process. The same is true of the rooms with the respective identification numbers "102" and "103".

Conversely, when the user status changes from the value indicating that the user is out to the value indicating that the user is at home, the controller 305 determines, in step S802, the room associated with the users including the user whose user status has changed. When another user other than the determined user is also associated with this room, as long as the determined user is included, the controller 305 determines the room also associated with, in addition to the determined user, the another user.

For example, when, in the room-user association table 600 illustrated in FIG. 6A, the user who has the changed user status is the father, the controller 305 determines the five rooms associated with at least the father and having the respective identification numbers "101", "102", "103", "201", and "202". Next, the controller 305 determines that the apparatus associated with any of those five rooms is to be controlled.

The room with the identification number "101" is associated with the three users who are the father, the mother, and the child. When at least anyone of those three users comes home, the controller 305 controls the apparatus associated with the room that has the identification number "101" to execute the predetermined process. The same is true of the rooms with the respective identification numbers "102" and "103".

According to this embodiment, the energy management system 1 can properly control the apparatus according to the individual circumstances of the user. The energy management system 1 can not only perform control for energy saving but also automatically controls the apparatus to operate as needed as desired by the user.

Third Embodiment

Next, a third embodiment is described. In each of the above embodiments, the controller 305 controls each apparatus and system based on the action schedule previously input by the user. In contrast, according to this embodiment, the controller 305 detects the presence or absence of the user, and controls each apparatus and system based on the detection result.

More specifically, the controller 305 determines whether each user is at home based on whether the terminal device 40 of each user is within the communication range of the home network 10. Next, when the user status indicating whether the user is at home changes, the controller 305 controls the apparatus associated with this user to execute the predetermined process. The specific details of the process to be executed are optional.

The controller 305 determines whether the user is at home based on a terminal device-and-user association table 1100 in which the user is associated with the identification information of the terminal device 40 as illustrated in FIG. 11, and based on the determination result on whether the terminal device 40 is communicable within the home network 10.

According to this embodiment, the identification information of the terminal device 40 is a media access control (MAC) address. However, it is appropriate if the identification information is information that can identify the terminal device 40, and the identification information may be a static IP address, a serial number, or a phone number in the case of a mobile phone.

The controller 305 transmits heartbeat signals to the terminal devices 40 of the respective users at a periodical timing. When there is a response to the transmitted heartbeat signal, the controller 305 determines that the terminal device 40 is present within the home, that is, the user associated with the terminal device 40 is at home. Next, the controller 305 sets, in the user status, a value indicating that the user is at home.

Conversely, when there is no response to the transmitted heartbeat signal, the controller 305 determines that the communication with the terminal device 40 is disconnected, and determines that the terminal device 40 is not present within the home, that is, the user associated with the terminal device 40 is out. Next, the controller 305 sets, in the user status, the value indicating that the user is out (not at home).

Next, the controller 305 controls the apparatus associated with the user whose user status has changed to execute the predetermined process.

A changed user status is typically a case in which the location of the determined user changes from the inside to the outside of the home, and a case in which the location of the determined user changes from the outside to the inside of the home.

When, for example, the user who is determined as being out is the father, the controller 305 acquires, from the room-user association table 600 illustrated in FIG. 6A, the identification number "202" of the room associated with the father only. In addition, the controller 305 determines that, from the apparatus-room association table 500 illustrated in FIG. 5A, the identification number of the apparatus to be controlled is "0008" (lighting device). Next, the controller 305 turns off the apparatus (lighting device) that has the determined identification number "0008".

When there are multiple determined users, the controller turns off the apparatus associated with all of the multiple determined users, and the apparatus associated with only a user among the multiple users.

According to this embodiment, the energy management system determines, based on whether the terminal device 40 of each user is within the communication range of the home network 10, the presence or absence of the user, and can properly control the apparatus.

The present disclosure is not limited to the above embodiments, and various changes and modifications are applicable. In addition, the respective components of the above embodiments can be freely combined.

In each of the above embodiments, the user inputs the schedule beforehand, and the controller 120 determines whether the date and time set in the schedule arrives. However, instead of having the user input the schedule beforehand, the user may be allowed to instruct the execution of a control in each case. In this case, the controller 305 of the controller 120 may determine that the user has input a schedule which has the starting date and time that is "right now", and which also has the ending date and time that is "not yet determined", and may operate the process previously associated with the apparatus.

For example, the controller 305 displays a software button associated with the father on the display, and determines the apparatus associated with the father when this software button is depressed by the user, and operate the process previously associated with the apparatus. Hence, the controller can collectively control all of predetermined apparatus associated with the father to operate by a single input operation. The same is true of the mother and the child. A hardware button may be adopted instead of the software button.

The controller 305 may display a button associated with any user, determine the apparatus associated with the user indicated by the touched button, and operate the process previously associated with the apparatus.

For example, the controller 305 displays a button indicating "visitor" who is not a family member. In addition, a specific room (for example, the living room in FIG. 2) is associated beforehand with the "visitor" in the room-user association table 600. When the "visitor" button is depressed, the controller 305 determines that the room associated with the "visitor" is the "living room", and controls the apparatus associated with the "living room" (the lighting device 104A-1, the air conditioner 102A, the TV 104A-2, and the floor heating system 105 in FIG. 2) to execute all together the respective processes assigned beforehand. According to this structure, the user can immediately run the multiple apparatuses through a single button operation.

A program that causes a computer to run as all of or a part of the above energy management system 1 may be distributed in a manner stored in a non-transitory computer-readable recording medium, such as a memory card, a CD-ROM, a DVD, or a magneto optical disk (MO), and may be installed in a separate computer to cause this computer to serve as the above means or to execute the above processes.

In addition, this program may be stored in a disk device or the like of a server device on the Internet, and may be downloaded to a computer in a manner, for example, superimposed on carrier waves.

As described above, each of the above embodiments enables the apparatus to be properly controlled according to the individual circumstances of a user.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the priority based on Japanese Patent Application No. 2013-105161, the entire contents of which are herein incorporated in this specification by reference.

REFERENCE SIGNS LIST

1 Energy management system
101 Autonomous switching board
102 Air conditioner
103 Ventilation system
104 Household electrical appliance
105 Floor heating system
106 IH cooker
107 Hot water supplying system
108 Power generating system
109 Electricity storage system
110 Electric vehicle
120 Controller
301 Inputter
302 Display
303 Storage
304 Communicator
305 Controller
400 Layout defining table
500 Apparatus-room association table
600 Room-user association table
700 Schedule table
900 Apparatus-room association table
1000 Schedule table
1100 Terminal device-and-user association table

The invention claimed is:

1. A home energy management controller comprising:
a program code including an update code and an apparatus control code;
at least one memory operable to prestore an apparatus-room association table in which a household electrical appliance or system installed in a home is associated with a room in which the household electrical appliance or system is installed and that is located in the home, and operable to prestore a room-user association table in which the room in which the household electrical appliance or system is installed and that is located in the home is associated with a user;
at least one processor operable to access the at least one memory and read the program code and operate as instructed by the program code; and
at least one of a button, a keyboard, or a touch panel configured to accept, from the user, a first input that is an input for an association between the user and a room to be newly associated with the user,
wherein
the apparatus-room association table is a separately stored and updated table from the room-user association table,
the update code is configured to cause the at least one processor to update the room-user association table based on the first input accepted by the at least one of the button, the keyboard, or the touch panel,
the apparatus control code is configured, when a user status that indicates whether the user is inside or outside the home changes, to cause the at least one processor to control power consumption of the household electrical appliance or system installed in the room used by the user whose user status is changed, based on the apparatus-room association table and the updated room-user association table,
the at least one processor executes the apparatus control code to control the power consumption in response to instructions from the program code, and
data regarding the room-user association table before being updated is entered into the at least one memory prior to the at least one processor executing the program code.

2. The home energy management controller according to claim 1, wherein
the apparatus control code is configured to cause the at least one processor to control the household electrical appliance or system corresponding to the user to execute a process corresponding to a movement of the user from inside to outside of the home when the user status changes from a status indicating that the user is inside the home to a status indicating that the user is outside the home.

3. The home energy management controller according to claim 1, wherein the apparatus control code is configured to cause the at least one processor to control the household electrical appliance or system corresponding to the user to execute a process corresponding to a movement of the user from outside to inside of the home when the user status changes from a status indicating that the user is outside the home to a status indicating that the user is inside the home.

4. The home energy management controller according to claim 1, wherein the at least one memory is operable to store a schedule table configured to store a schedule of the user inputted by the user, and the apparatus control code is configured to cause the at least one processor to control, when a time specified by the schedule of the user arrives, the household electrical appliance or system corresponding to the user, based on the apparatus-room association table and the updated room-user association table.

5. The home energy management controller according to claim 4, wherein information that specifies a process to be executed when the time specified by the schedule of the user arrives is stored, in the apparatus-room association table, in association with the household electrical appliance or system; and the apparatus control code is configured to cause the at least one processor to execute the process specified in the apparatus-room association table.

6. The home energy management controller according to claim 5, wherein the schedule stored in the schedule table specifies a starting time of the schedule and an ending time of the schedule; and the apparatus control code is configured to cause the at least one processor to control, when the starting time arrives, the household electrical appliance or system corresponding to the user associated with the schedule having the starting time arrived, to execute the specified process, and when the ending time arrives, the household electrical appliance or system corresponding to the user associated with the schedule having the arrived ending time, to execute the specified process.

7. The home energy management controller according to claim 6, wherein the at least one of the button, the keyboard, or the touch panel is further configured to accept, from the user, a second input that is an input indicating the schedule including the starting time and the ending time, and to accept, from the user, a third input that is an input specifying the process to be executed when the starting time or the ending time arrives, wherein the update code is further configured to cause the at least one processor to update the at least one memory and the schedule table based on the second input and the third input accepted by the at least one of the button, the keyboard, or the touch panel.

8. The home energy management controller according to claim 1, further comprising:

a communicator configured to wirelessly communicate with a terminal device, wherein the at least one memory is operable to store an identification information table configured to store the user and identification information of the terminal device of the user in association with each other, and the apparatus control code is configured to cause the at least one processor to control, when a communication between the communicator and the terminal device is disconnected, the household electrical appliance or system corresponding to the user associated with the identification information of the terminal device of which the communication with the communicator is disconnected.

9. The home energy management controller according to claim 1, wherein when there is a plurality of users having changed user status, the apparatus control code is configured to cause the at least one processor to control the household electrical appliance or system associated with all of the users having the changed user status and the household electrical appliance or system associated with a single user among the user having the changed user status.

10. The home energy management controller according to claim 1, wherein the program code includes a determination code configured to cause the at least one processor to determine, based on the updated room-user association table and the apparatus-room association table, at least one user associated with each household electrical appliance or system in the home.

11. The home energy management controller according to claim 1, wherein the program code includes a determination code configured to cause the at least one processor to determine device-user association data associating the household electrical appliance or system installed in the room with at least one user, and the device-user association data is generated based on the updated room-user association table and the apparatus-room association table.

12. The home energy management controller of claim 1, wherein the apparatus-room association table is a separately generated table from the room-user association table.

13. The home energy management controller according to claim 1, wherein the at least one of the button, the keyboard, or the touch panel are further configured to accept, from the user, a second input different from the first input that is an input for an association between a new household electrical appliance or system installed in the home and a second room in which the household electrical appliance or system is installed and that is located in the home, and the update code is further configured to cause the at least one processor to update the apparatus-room association table based on the second input accepted by the at least one of the button, the keyboard, or the touch panel.

14. The home energy management controller according to claim 1, wherein the at least one of the button, the keyboard, or the touch panel is further configured to accept, from the user, a second input different from the first input that is an input for an association between a second user and a second room to be newly associated with the second user, and the update code is further configured to cause the at least one processor to update the room-user association table based on the second input accepted by the at least one of the button, the keyboard, or the touch panel.

15. The home energy management controller according to claim 1, wherein the at least one of the button, the keyboard, or the touch panel is further configured to accept, from the user, a second input different from the first input that is an input for an association between the user and a second room to be newly associated with the user, and the update code is further configured to cause the at least one processor to update the room-user association table based on the second input accepted by the at least one of the button, the keyboard, or the touch panel.

16. A home energy management controller comprising:

a program code including an update code and an apparatus control code;

at least one memory operable to prestore an apparatus-room association table in which a household electrical appliance or system installed in a home is associated with a room in which the household electrical appliance or system is installed and that is located in the home, and operable to prestore a room-user association table in which the room in which the household electrical appliance or system is installed and that is located in the home is associated with a user;

at least one processor operable to access the at least one memory and read the program code and operate as instructed by the program code; and at least one of a button, a keyboard, or a touch panel configured to accept, from the user, a first input that is an input for an association between the user and a room to be newly associated with the user, wherein the update code is configured to cause the at least one processor to update the room-user association table based on the first input accepted by the at least one of the button, the keyboard, or the touch panel, the apparatus-room association table is a separately stored and updated table from the room-user association table, the apparatus control code is configured to cause the at least one processor to, when a first user status that indicates that a first user is inside the home changes and a second user status that indicates that a second user is inside the home does not change, control power consumption of the household electrical appliance or system installed in the room used by the first user and not used by the second user, based on the updated room-user association table and the apparatus-room association table, the at least one processor executes the apparatus control code to control the power consumption in response to instructions from the program code, and data regarding the room-user association table before being updated is entered into the at least one memory prior to the at least one processor executing the program code.

17. The home energy management controller of claim 16, wherein the apparatus-room association table is a separately generated table from the room-user association table.

18. A home energy management and control system comprising:

a program code including an update code and an apparatus control code;

at least one memory operable to prestore an apparatus-room association table in which a household electrical appliance or system installed in a home is associated with a room in which the household electrical appliance or system is installed and that is located in the home, and operable to prestore a room-user association table in which the room in which the household electrical appliance or system is installed and that is located in the home is associated with a user;

at least one processor operable to access the at least one memory and read the program code and operate as instructed by the program code; and at least one of a button, a keyboard, or a touch panel configured to accept, from the user, a first input that is an input for an association between the user and a room to be newly associated with the user, wherein the apparatus-room association table is a separately stored and updated table from the room-user association table, the update code is configured to cause the at least one processor to update the room-user association table based on the first input accepted by the at least one of the button, the keyboard, or the touch panel, the apparatus control code is configured to cause the at least one processor to control, when a user status that indicates whether the user is inside the home changes, power consumption of the household electrical appliance or system installed in the room used by the user whose user status is changed, based on the apparatus-room association table and the updated room-user association table, the at least one processor executes the apparatus control code to control the power consumption in response to instructions from the program code, and data regarding the room-user association table before being updated is entered into the at least one memory prior to the at least one processor executing the program code.

19. The home energy management and control system according to claim 18, further comprising:

an autonomous switching board, wherein the home energy management and control system operates in a selected operating mode that is one of an interconnection mode or an autonomous operating mode, the interconnection mode is a mode in which the home is connected to a commercial power source, the autonomous operating mode is a mode in which the home is disconnected from the commercial power source, and the selected operating mode is switched by the autonomous switching board based on a power supply status detected from the commercial power source.

20. The home energy management and control system of claim 18, wherein the apparatus-room association table is a separately generated table from the room-user association table.

21. A home energy management control method comprising:

storing an apparatus-room association table in which a household electrical appliance or system installed in a home is associated with a room in which the household electrical appliance or system is installed and that is located in the home and a room-user association table in which the room in which the household electrical appliance or system is installed and that is located in the home is associated with a user in at least one memory;

accepting, from the user, a first input that is an input for an association between the user and a room to be newly associated with the user;

updating the room-user association table based on the accepted first input; and controlling, when a user status that indicates whether the user is inside or outside the home changes, power consumption of the household electrical appliance or system installed in the room used by the user whose user status is changed, based on the apparatus-room association table and updating the updated room-user association table, wherein the apparatus-room association table is a separately stored and updated table from the room-user association table, data regarding the room-user association table before being updated is stored prior to an operation of controlling the power consumption of the household electrical appliance or system.

22. The home energy management control method of claim 21, wherein the apparatus-room association table is a separately generated table from the room-user association table.

23. A non-transitory computer-readable recording medium storing a program, the program causing a computer to function as:

a table storage configured to prestore an apparatus-room association table in which a household electrical appliance or system installed in a home is associated with a room in which the household electrical appliance or system is installed and that is located in the home, and to prestore a room-user association table in which the room in which the household electrical appliance or system is installed and that is located in the home is associated with a user;

an updater configured to update the room-user association table based on a first input accepted by at least one of a button, a keyboard, or a touch panel, the first input being an input for an association between the user and a room to be newly associated with the user; and an apparatus controller configured to control, when a user status that indicates whether the user is inside the home changes, power consumption of the household electrical appliance or system installed in the room used by the user whose user status is changed, based on the apparatus-room association table and the updated room-user association table, wherein the apparatus-room association table is a separately stored and updated table from the room-user association table, data regarding the room-user association table before being updated is entered into the table storage prior to the apparatus controller controlling the power consumption of the household electrical appliance or system, and wherein the program is configured to be executed by at least one processor in the computer.

24. The non-transitory computer-readable recording medium of claim 23, wherein the apparatus-room association table is a separately generated table from the room-user association table.

* * * * *